Feb. 1, 1949.  T. L. FAWICK  2,460,631
SHAFT FASTENING ASSEMBLY
Filed Nov. 17, 1945  2 Sheets-Sheet 1

THOMAS L. FAWICK
INVENTOR.
BY Willard D. Eakin
ATTORNEY

Feb. 1, 1949.    T. L. FAWICK    2,460,631
SHAFT FASTENING ASSEMBLY
Filed Nov. 17, 1945    2 Sheets-Sheet 2
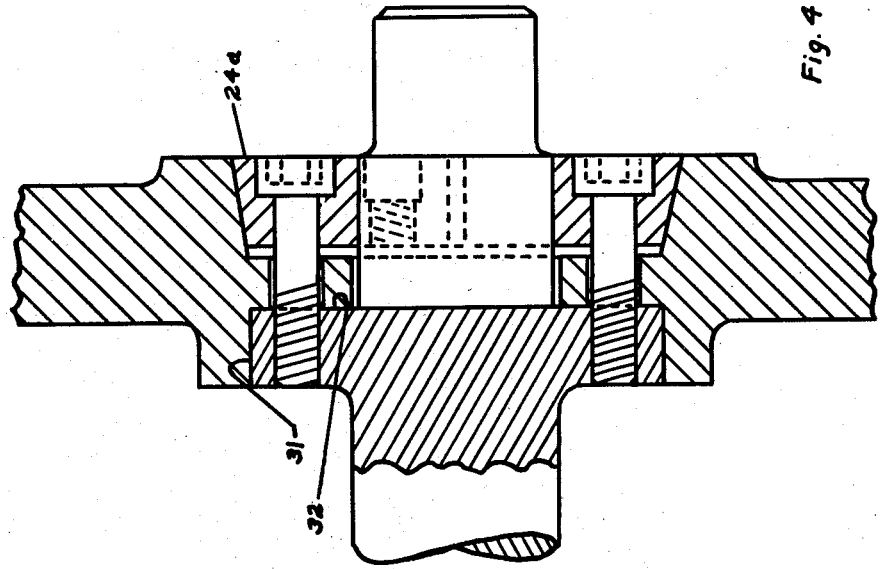
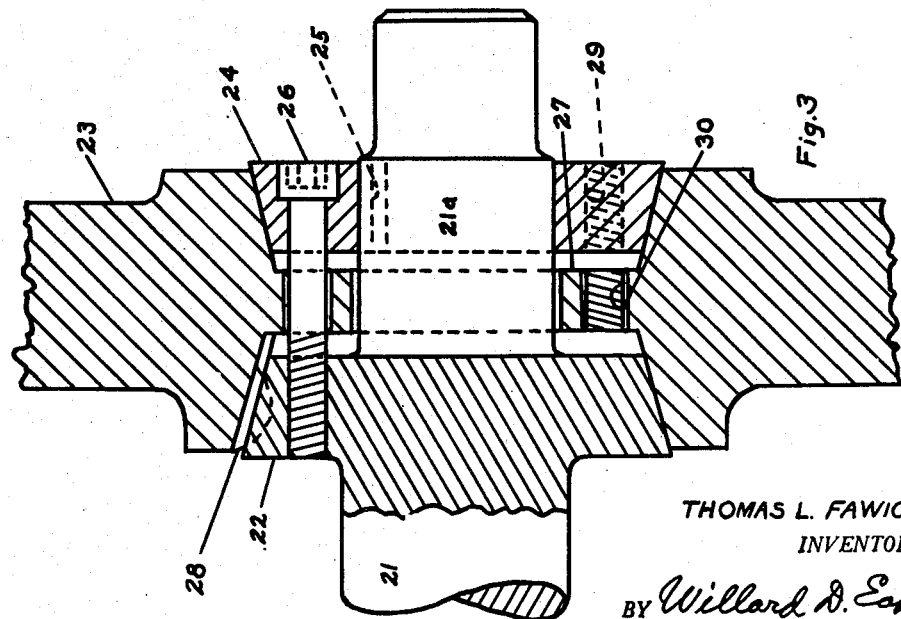
THOMAS L. FAWICK
INVENTOR.

Patented Feb. 1, 1949

2,460,631

UNITED STATES PATENT OFFICE 2,460,631

SHAFT-FASTENING ASSEMBLY

Thomas L. Fawick, Cleveland, Ohio

Application November 17, 1945, Serial No. 629,229

7 Claims. (Cl. 287—114)

This invention relates to means for fastening a shaft to a wheel, gear, pulley or the like mounted thereon or to another shaft.

Its chief objects are to provide a secure and accurate fastening; to provide that result with simplicity and economy for structure; and to provide ease of assembly and disassembly of the parts.

Of the accompanying drawings:

Fig. 3 is a fragmentary axial section of an assembly comprising a shaft and a rotary member secured thereon, the assembly embodying my invention in another one of its preferred forms.

Fig. 4 is a similar section illustrating another modification.

Figure 1:
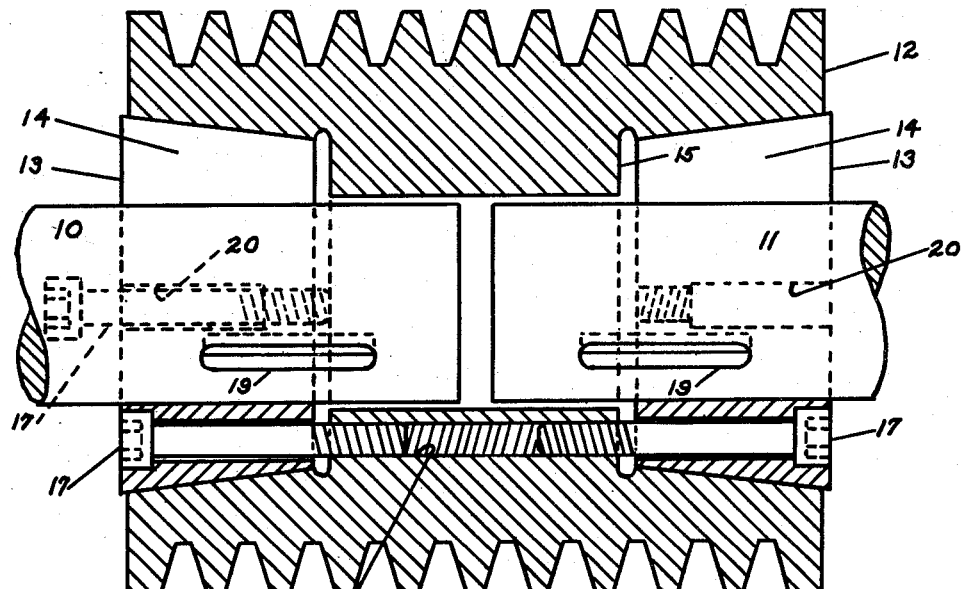
Fig. 1 is an axial section, on line 1—1 of Fig. 2, of an assembly comprising two aligned shafts and means for coupling them one to the other, the assembly embodying my invention is one of its preferred forms.
Figure 2:
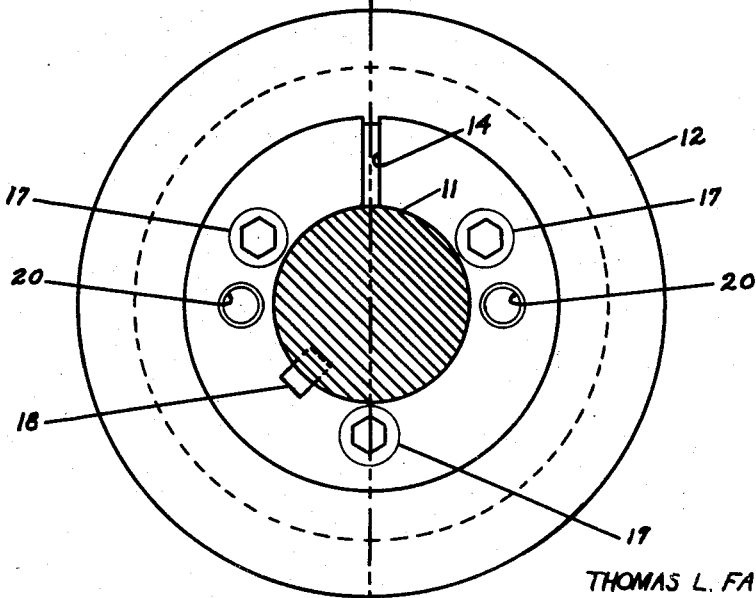
Fig. 2 is an end view of the same, from the right of Fig. 1, one of the shafts being shown in section.

Referring to Figs. 1 and 2 of the drawings, the assembly there shown comprises a pair of aligned shafts 10 and 11 joined by structure comprising an annular, rotary member 12, which can be a multiple V-belt pulley, as shown, or other type of peripherally functioning power-transmitting member, or merely a shaft-coupling member, when shafts are to be coupled. The invention of Figs. 1 and 2 is not limited to the coupling of shafts to each other.

At each end the member 12 is formed with a conical inner face tapered toward the middle of the member for reception of a wedging ring 13 which is complementally tapered on its outer face and is formed with a "split" or gap at 14 to permit it to be contracted against the shaft within it in being drawn into its tapered seat in the member 12.

For so drawing it the member 12 is formed in its middle region with a wide internal annular flange 15 which at a plurality of circumferentially spaced positions is formed with threaded, axially disposed through apertures like the threaded hole 16 of Fig. 1 and bolts or screws such as the Allen screws 17, 17 extend, with clearance, through holes formed in the wedging rings 13 and are screwed into the holes 16 from opposite ends of the holes.

The clearance between the screws 17 and the walls of their holes in the wedging rings permits the use of a key 18 (Fig. 2) mounted in a key-way formed in the inner face of ring and in a key-way 19 formed in the shaft, without the key interfering with even radial wedging action substantially throughout the circle of the assembly.

For forcing them out of their seats in the dismounting of the assembly each of the wedging rings is formed with a circumferentially spaced set of holes 20, 20 extending axially through it, each hole having a small-diameter inner end portion threaded for the screwing therethrough of the threaded end portion of one of the screws 17 as illustrated in the left-hand part of of Fig. 1, the screws thus being adapted to push against a side face of the internal flange 15 of the annular member 12 and thus force the wedge rings 13 out of their tapered sockets and thus loosen all of the parts for disassembly.

As only a part of each hole 20 is of small diameter and threaded, the screws 17 are required to be threaded throughout only a small part of their lengths.

The proper proportioning of the parts and the use of the Allen type of screws provides an assembly free of dangerously projecting parts.

The assembly shown in Fig. 3 comprises a shaft 21 formed with a flange 22 having a conical outer face for wedging reception of a complementally tapered inner face formed in the hub of a rotary member 23 such as a gear, pulley or wheel requiring to be secured on the shaft.

At its other side the hub of the member 23 is formed with a conical inner face for the reception of a wedging ring 24 transversely split as at 25 to adapt it to be contracted against a cylindrical portion 21a of the shaft as the ring 24 is forced into its conical seat.

For so forcing the ring, a circumferentially spaced set of screws, preferably of the Allen screw type, such as the screw 26 extend axially through the ring 24 and, preferably with substantial clearance, through an internal annular flange 27 formed in the hub of the member 23 and are screwed into the flange 22 of the shaft.

Suitable keys may be employed, such as the key 28 shown as being interposed between the flange 22 and the member 23.

For backing the wedge ring 24 out of its conical seat and thus loosening it upon the shaft the ring is formed with a circumferentially spaced set of threaded holes, such as the hole 29, extending axially through it, so that upon removal of the screws 26 from the holes in which they perform their clamping function then can be screwed through the holes 29 in the ring 24 and against the flange 27 of the member 23.

Likewise, but in positions circumferentially offset from the holes 29 in the ring, the flange 27 is formed with a circumferentially spaced set of threaded holes, such as the hole 30, extending axially through it, so that after the ring 24 has been removed from the assembly the screws 26 can be screwed through the holes 30 and against the flange 22 for forcing the member 23 from the tapered face of the flange 22.

The assembly shown in Fig. 4 corresponds closely to that shown in Fig. 3 except that the outer face 31 of the shafts' flange and the mating face of the hub are cylindrical to permit plane radial faces of the hub and of the flange to come flatly into contact with each other, at 32, and, thus assure proper positioning and true running of the hubbed member, and the wedging ring, 24a, and its seat are of such proportionate diameters as to permit the ring to be drawn farther toward the middle plane of the hub than in Fig. 3, so that the radial and torsional forces are sustained chiefly by the wedge ring rather than by the shafts' flange.

In this assembly of Fig. 4 the wedge ring is formed with a split, 25a, and with threaded holes such as the hole 29a for backing the wedge out of its seat by means of the screws, but because of their being no wedging action between the hub and the shafts' flange corresponding holes through the hub's flange are not necessary.

Further modifications are possible, within the scope of the appended claims.

I claim:

1. A shaft-fastening assembly comprising a rotary annular member adapted to surround a shaft to which it is to be secured, said member being formed with a conical inner face in effect, at least, surrounding the shaft and tapered axially inward from an end face of the member, and with an internal flange adjacent the smaller end of said conical face, a wedging member tapered for wedging coaction with only the shaft and said conical face, and terminating short of said flange, and a threaded member extending through said wedging member, at a less radius from the shaft's axis than that of any part of said conical face, and threaded means coacting with said threaded member for pulling said wedging member toward said flange.

2. An assembly as defined in claim 1 in which the defined flange is formed with a threaded hole into which the threaded member is screwed.

3. An assembly as defined in claim 1 in which the wedging member is formed with a hole in which the threaded member is slidable, to be occupied by the threaded member in the pulling operation, and with a threaded hole, at a less radius from the shaft's axis than that of any part of the conical faces, through which hole a threaded member can be screwed for contact of its end face with the defined flange for backing out the wedging member.

4. An assembly as defined in claim 1 in which the defined rotary member has a conical inner face, as defined, extending axially inward from each of its ends, the assembly including a wedging member and threaded means as defined for coaction with each of said faces, and the defined flange being formed with threaded through apertures each adapted to receive two threaded members screwed into it from its opposite ends.

5. An assembly as defined in claim 1 in which the shaft has a head which is the threaded means coacting with the threaded member as defined.

6. An assembly as defined in claim 1 in which the shaft has a head which is the threaded means coacting with the threaded member as defined, and also is formed with a stop-face for coaction with the defined internal flange.

7. An assembly as defined in claim 1 in which the wedging member comprises as its only essential part a body which is permissibly of quadrilateral form in axial section.

THOMAS L. FAWICK.

REFERENCES CITED

The following references are of record in the file of this patent:

UNITED STATES PATENTS

| Number | Name | Date |
|---|---|---|
| 62,081 | Smith | Feb. 12, 1861 |
| 304,110 | Kriebel | Aug. 26, 1884 |
| 364,537 | Miller | June 7, 1887 |
| 369,136 | Stuart | Aug. 30, 1887 |
| 488,867 | Brennan | Dec. 27, 1892 |
| 535,654 | Althouse | Mar. 12, 1895 |
| 687,864 | Smyth | Dec. 3, 1901 |
| 838,231 | Ahara | Dec. 11, 1906 |
| 907,300 | Sturtevant | Dec. 22, 1908 |
| 1,378,091 | Carlsen | May 17, 1921 |
| 1,393,064 | Woodward | Oct. 11, 1921 |
| 2,381,697 | Shepard | Aug. 7, 1945 |
| 2,396,414 | Firth | Mar. 12, 1946 |